United States Patent [19]

Lollis et al.

[11] 4,448,340

[45] May 15, 1984

[54] APPARATUS FOR REPLACING BOLSTER RINGS

[76] Inventors: Glen R. Lollis, 10405 Mockingbird Dr.; Marvin G. Marler, 9926 Orchard Ave., both of Omaha, Nebr. 68127; Joe P. Car, 5114 California St., Omaha, Nebr. 68132; Sam J. John, 6208 Parker, Omaha, Nebr. 68104

[21] Appl. No.: 349,263

[22] Filed: Feb. 16, 1982

Related U.S. Application Data

[62] Division of Ser. No. 171,121, Jul. 22, 1980, Pat. No. 4,330,076.

[51] Int. Cl.³ ............................................. B23K 37/02
[52] U.S. Cl. .................................. 228/29; 29/402.13; 228/49 R; 266/70; 266/71
[58] Field of Search ............................. 228/29, 49 R; 29/402.13, 402.07; 266/56, 70, 71

[56] References Cited

U.S. PATENT DOCUMENTS

| | | | |
|---|---|---|---|
| 1,900,682 | 3/1933 | Alcott | 228/119 |
| 3,273,232 | 9/1966 | Royer | 29/402.13 |
| 3,417,979 | 12/1968 | Cable et al. | 266/71 X |
| 3,711,927 | 1/1973 | Davidson | 228/119 |
| 3,894,676 | 7/1975 | Oppenheim et al. | 228/182 |
| 4,264,058 | 4/1981 | Wear et al. | 266/70 |

*Primary Examiner*—Kenneth J. Ramsey
*Attorney, Agent, or Firm*—Robert A. Ostmann

[57] ABSTRACT

The disclosure concerns a procedure for replacing a worn bolster ring on a freight car truck bolster which utilizes a motorized circle cutting and welding machine which rests upon the bolster and is centered by supporting structure positioned by locating pins which engage two pairs of mounting holes for the side bearing cages. The worn ring is cut from the bolster by a cutting torch driven around the circumference of the ring by the motorized machine. Then, the replacement ring is placed on the cut bolster surface, centered with respect to the axis of the motorized machine and tack welded, and finally welded to the bolster by a welding head which traverses the inner and outer peripheral surfaces of the ring under the control of the motorized machine.

2 Claims, 12 Drawing Figures

APPARATUS FOR REPLACING BOLSTER RINGS

CROSS REFERENCE TO RELATED APPLICATION

This application is a division of pending application Ser. No. 171,121, filed July 22, 1980, now U.S. Pat. No. 4,330,076.

BACKGROUND AND SUMMARY OF THE INVENTION

The bolster of a railway freight car truck includes a centrally located ring which forms part of the pivotal connection between the truck and the car body. During service, the bolster ring may become severely worn or damaged, thereby rendering the bolster unfit for further use. In the past, worn rings were replaced by a burdensome procedure which entailed removing the bolster from the truck and mounting it on a large lathe so that the worn ring could be machined away. Thereafter, a replacement ring was placed on the machined surface, centered as best as possible by taking measurements to the mounting holes of the side bearing cages, and then welded in place manually. The particular ring renewal procedure with which we are acquainted required six hours.

The object of this invention is to provide an improved method and apparatus for replacing worn bolster rings. According to the invention, the new replacement technique employs a motorized circle cutting and welding machine which is automatically centered with respect to the bolster ring by supporting structure which engages mounting holes of the side bearing cages. The scheme utilize the two pairs of cage-mounting holes which are spaced from the ring center a uniform distance of 25" on nearly every freight car bolster now used by American railroads; therefore, careful design and fabrication of the supporting structure guarantees accuracy, eliminates the need for positioning adjustments, and enables ring replacement to be carried out on a routine basis. The worn ring is cut from the bolster using a torch driven by the motorized machine, thereby leaving a cut surface which lies in a plane parallel with the top surface of the bolster and which, except possibly for the hand removal of small slag deposits, requires no further dressing or trueing. After the worn ring is removed, the replacement ring is placed on the torch cut surface, centered automatically by a jig positioned by the motorized machine, tack welded to hold it in place, and then finish welded by a welding head driven around both the inner and outer peripheral surface of the ring by the motorized machine. The equipment required by the new replacement technique is portable, so removal of the bolster from the truck is not necessary. Furthermore, the entire ring replacement procedure may be carried out by one man in about an hour.

BRIEF DESCRIPTION OF THE DRAWINGS

The preferred embodiment of the invention is described herein with reference to the accompanying drawings, in which.

DESCRIPTION OF ILLUSTRATED EMBODIMENT

Figure 1:
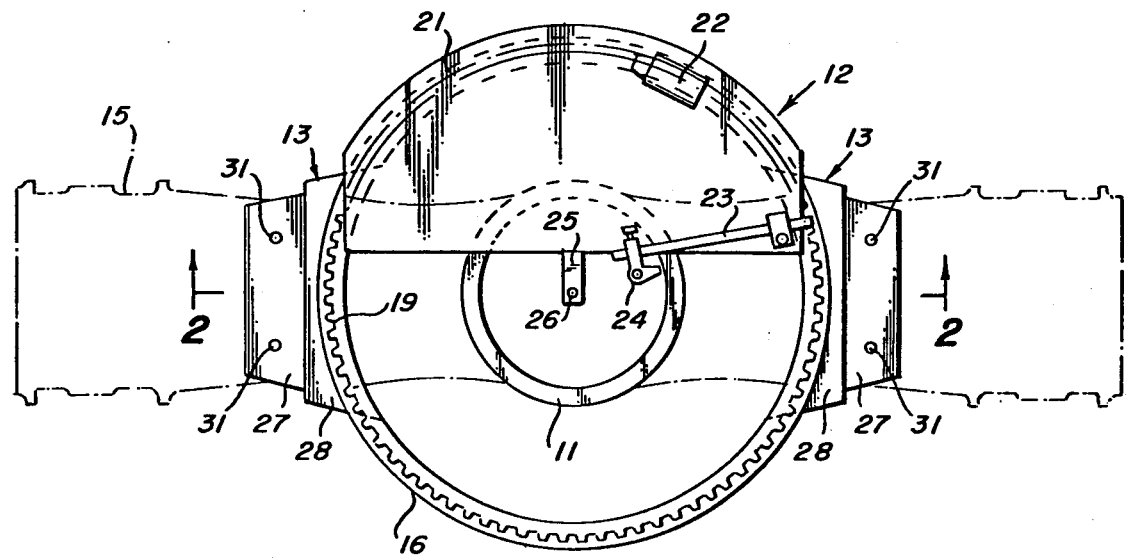
FIG. 1 is a simplified plan view of the motorized cutting and welding machine and its supporting structure.
Figure 2:
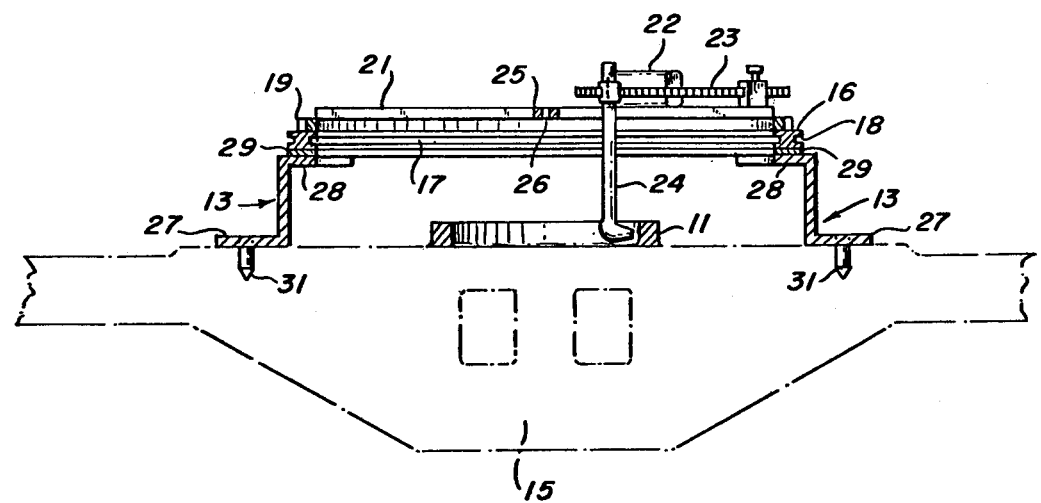
FIG. 2 is a sectional view taken on line 2—2 of FIG. 1.

Referring to FIGS. 1-4, the apparatus employed in the emproved technique for replacing a worn bolster ring 11 conprises a motorized circle cutting and welding machine 12, a supporting fixture in the form of a pair of identical brackets 13, and a jig 14 for centering the new bolster ring 11[1] on the bolster 15. Machine 12 may be a commercially available product, such as the CIR-O Machine marketed by Weld Tooling Corporation, of Pittsburgh, Pa. This machine includes an annular track 16 which has guide grooves 17 and 18, respectively, formed in its inner and outer peripheral surfaces and carries a ring gear 19, and a movable carriage 21 which is guided for rotational movement about track 16 by rollers (not shown) which fit grooves 17 and 18. The carriage is driven by an electric motor unit 22, including a speed reducing gear train and an output drive gear (not shown) which meshes with ring gear 19. Carriage 21 carries a universally adjustable, rack type holder 23 for cutting torch and welding units 24, and is provided with a center locator conprising a projecting arm 25 containing a through bore 26 which is coaxial with track 16. Additional and more detailed information concerning the basic construction of machine 12 may be obtained from U.S. Pat. No. 3,417,979, granted Dec. 24, 1968.

The support brackets 13 serve to hold machine 12 at an elevation above the top surface of bolster 15, with track 16 parallel with that surface and centered relatively to ring 11. Each bracket is of Z-shape and includes a planar foot portion 27 which is adapted to rest upon the upper surface of the bolster, and a planar shelf portion 28 which underlies track 16. Brackets 13 are bolted to track 16 at diametrically opposite locations, with a ¼" shim or spacer 29 interposed between the joined parts to provide clearance for free travel of carriage 21. Each bracket also includes a pair of depending locating pins 31, which have threaded, upper portions of reduced diameter which are screwed into tapped through holes in foot portion 27. These pins 31 are sized and positioned to fit a set of four accurately located mounting holes present in almost every freight car truck bolster now used by the U.S. railroads. These mounting holes are provided for the side bearing cages of the truck and are arranged in pairs at opposite sides of the ring 11, and each of which is spaced 25" from the center of the ring. Thus, the center-to-center spacing of the two pairs of pins 31 in the assembly of machine 12 and brackets 13 is 50", and that assembly is so constructed that the axis of track 16 is centered with respect to those pins.

Figure 3:
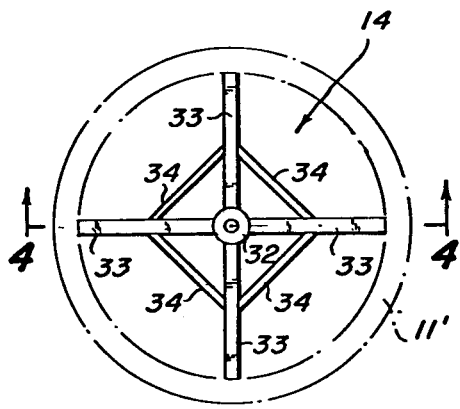
FIG. 3 is a plan view of the jig used to center the replacement ring.
Figure 4:
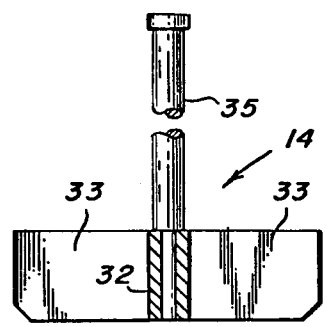
FIG. 4 is a sectional view taken on line 4—4 of FIG. 3.

The centering jig 14, employed during installation of the replacement ring 11[1] is shown in FIGS. 3 and 4, and comprises a welded spoke portion having a hub 32, four equiangularly spaced blades 33 which are sized to engage the inner peripheral surface of ring 11[1], and a set of diagonal braces 34. In addition, the jig includes a locating pin 35 having an upper portion sized to fit the bore 26 in center locator arm 25 of machine 12, and a lower reduced diameter portion which fits a centrally located bore in hub 32.

Figure 5:
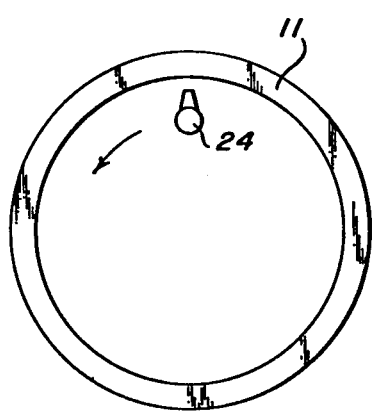
FIGS. 5-12 are diagrammatic plan and sectional views of the bolster rings showing various stages of the ring replacement process.

In order to replace a worn bolster ring 11, the affected truck is first disconnected from the freight car and moved to an appropriate work station, which may be in a maintenance shop or at the site of the car. The assembly comprising machine 12 and support brackets 13 is then placed upon the upper surface of bolster 15 so that the locating pins 31 engage the four cage-mounting holes mentioned earlier. Next, a cutting torch 24 is clamped in holder 23 and positioned so that it addresses the inner surface of the ring 11 and will cut the ring at an elevation about ¼" about the upper surface of the bolster. While it is possible to cut-off ring 11 from the outside, inside cutting is preferred because the interior fillet at the base of the ring is smaller than the corresponding exterior fillet, and this makes it easier to gauge the height at which the ring is to be cut. After the torch 24 is properly positioned, it is turned on and motor unit 22 is energized. As a result, the torch is driven around the circumference of ring 11, as indicated in FIG. 5, and is enabled to cut the ring from the bolster.

Figure 6:
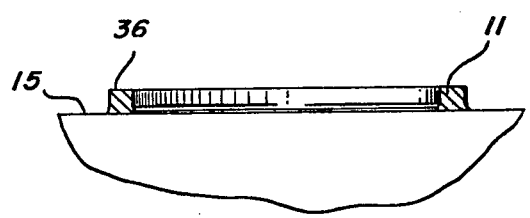

Since the support brackets 13 hold track 16 parallel with the upper surface of the bolster 15, the torch cut surface 36 of the bolster (see FIG. 6) is planar and parallel with the top of the bolster. Except for occasional slag deposits, which may be removed easily and quickly by chipping or grinding while machine 12 is in place on the bolster, the torch cutting operation leaves a finished surface 36 which needs no dressing or trueing.

Figure 7:
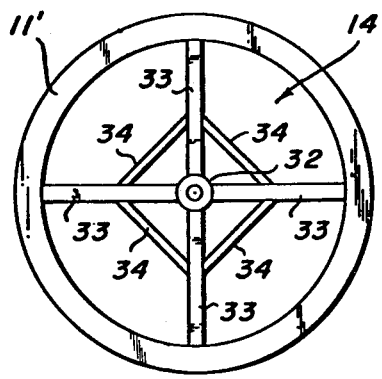
Figure 8:
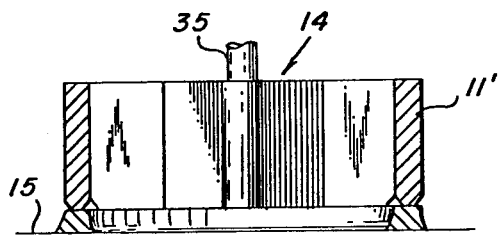
Figure 9:
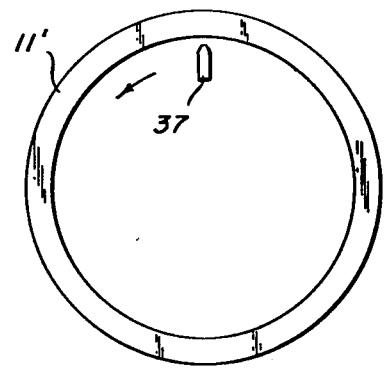
Figure 10:
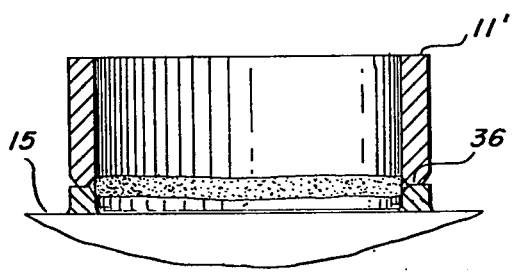
Figure 11:
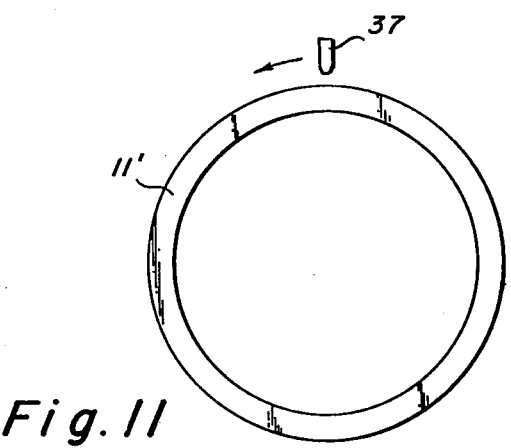
Figure 12:
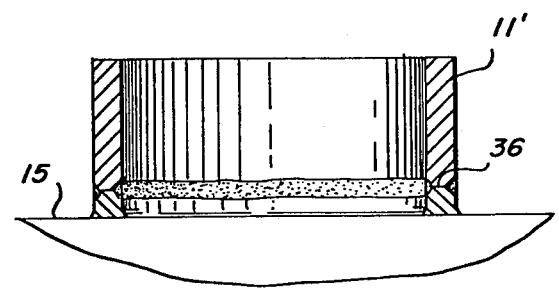

After ring 11 has been cut off and any slag deposits on surface 36 have been removed, the replacement bolster ring 11[1] is set on surface 36, centered by means of jig 14 and locator arm 25, as depicted in FIGS. 7 and 8, and tack welded to the bolster at several points around its exterior to hold it in the centered position. Then, jig 14 is removed, and, as indicated in FIGS. 9-12, the new ring 11[1] is welded in place permanently using a wire welder 37 which is mounted in holder 23 and which is driven around both the inner and outer peripheral surfaces of the ring. Although single internal and external passes of the welding head may be sufficient, experience indicates that two internal passes and three external passes give a more reliable welded joint.

We claim:

1. Apparatus useful in replacing a worn bolster ring on a freight car truck bolster which contains two pairs of mounting holes for side bearing cages which are spaced laterally from the axis of said ring a uniform distance, the apparatus comprising
   a. a motorized circle cutting and welding machine including an annular track, and a movable carriage which is driven around the track by a motor and is adapted to carry torch cutting and welding devices;
   b. diametrically opposed support members attached to the track and arranged to rest upon the upper surface of said bolster and hold the track parallel with the surface;
   c. two locating pins attached to and depending from each support member, the pins being sized and positioned to fit said mounting holes and thereby center the annular track with respect to those holes;
   d. a centering jig which is adapted to engage a replacement bolster ring and hold it against movement in a plane perpendicular to its axis; and
   e. means for removably attaching the jig to the movable carriage in a position in which it is coaxial with, but at an elevation below, the track.

2. Apparatus as defined in claim 1 in which
   a. the movable carriage includes a member containing a through bore which is coaxial with the track; and
   b. the jig includes a spoke portion which engages the inner peripheral surface of a replacement bolster ring, and a coaxial upstanding rod which fits the bore in said member of the carriage.

* * * * *